United States Patent [19]

Min et al.

[11] Patent Number: 4,965,130

[45] Date of Patent: Oct. 23, 1990

[54] LATEX COATING COMPOSITION OF MULTILAYERED COPOLYMER PARTICLES OF VINYLIDENE CHLORIDE AND ACRYLIC COMONOMERS

[75] Inventors: Taeik Min, Pittsford; Robert E. Touhsaent, Fairport, both of N.Y.

[73] Assignee: Mobil Oil Corporation, Fairfax, Va.

[21] Appl. No.: 433,254

[22] Filed: Nov. 8, 1989

Related U.S. Application Data

[62] Division of Ser. No. 343,660, Apr. 27, 1989, Pat. No. 4,898,782.

[51] Int. Cl.$^5$ .............................................. C08L 27/08
[52] U.S. Cl. .................................... 428/407; 523/201; 525/902
[58] Field of Search ................ 523/201; 525/214, 308, 525/317, 902; 428/407

[56] References Cited

U.S. PATENT DOCUMENTS

| | | | |
|---|---|---|---|
| 3,309,330 | 3/1967 | Settlage | 260/ |
| 4,058,649 | 11/1977 | Steiner | 428/ |
| 4,307,006 | 12/1981 | Suzuki et al. | 260/ |

Primary Examiner—Joseph L. Schofer
Assistant Examiner—Jeffrey T. Smith
Attorney, Agent, or Firm—A. J. McKillop; C. J. Speciale; M. J. Mlotkowski

[57] ABSTRACT

A semi-continuous, multi-stage polymerization process is provided for synthesizing a heat-sealable multi-layered composite particle latex. The multi-layered composite latex particles of this invention provide excellent oxygen and vapor barrier properties without hindering the desired surface properties, including high heat-sealing strength, low minimal seal temperature, excellent machinability, i.e. low blocking and low coefficient of friction. The latex particles of the present invention are formed as three-layered composite particles having an acrylic ester seed layer composed of a copolymer of methyl methacrylate and methyl acrylate. The latex particles have an intermediate core layer composed of a terpolymer having a high vinylidene chloride concentration, the other comonomers of the core layer include methyl acrylate and methacrylic acid. The latex particles also include an outer skin layer composed of a terpolymer having a low vinylidene chloride concentration, the other comonomers of the outer skin layer also include methyl acrylate and methacrylic acid. An aqueous latex of these particles is coated when wet onto substrates, such as thermoplastic films, i.e. oriented polypropylene or polyethylene films. After drying, the coated film exhibits superior oxygen and vapor barrier properties, excellent surface properties including good machinability and sealability. The coated film also exhibits excellents heat-seal strength and low minimum sealing temperature.

4 Claims, 1 Drawing Sheet

LATEX COATING COMPOSITION OF MULTILAYERED COPOLYMER PARTICLES OF VINYLIDENE CHLORIDE AND ACRYLIC COMONOMERS

This is a division of Ser. No. 343,660, filed 4/27/89, now U.S. Pat. No. 4,898,782.

BACKGROUND OF THE INVENTION

1. Field of the Invention

The present invention relates to latex coating compositions for application to film substrate materials such as thermoplastic films, for example, oriented polypropylene films.

2. Background of the Related Art

Latex coating compositions are well-known for improving the surface qualities of thermoplastic films, such as oriented polypropylene and polyethylene films. A Latex is an aqueous dispersion of spherical polymer particles in the range of about 0.01 to about 1.0 micron (0.0004-0.04 mils) in diameter.

U.S. Pat. No. 4,058,649, the disclosure of which is incorporated by reference herein, describes the process of preparing a latex obtained by emulsion polymerization and its use for coating thermoplastic film substrates. The latex coating particles described in U.S. Pat. No. 4,058,649 contain approximately 80% vinylidene chloride, 10% methyl acrylate and 10% methacrylic acid forming two layered latex particles. The higher the concentration of vinylidene chloride, i.e. 80% or more, provides improved oxygen and vapor barrier qualities while the methyl acrylate improves heat sealability and surface qualities. However, at these concentrations the coated films exhibit high blocking and a high coefficient of friction which results in poor machinability and processability of the coated films in heat-sealing apparatus. In addition, the heat-seal strength such films is low. Alternatively, if the vinylidene chloride concentration is lowered while the concentration acrylic esters is raised, the surface qualities, i.e., blocking, coefficient of friction and heat-seal strength increase. However, lowering of the vinylidene chloride concentration results in worsened barrier properties, i.e., transmission of gasses such as oxygen, vapors, and the like.

Another type of latex coating particle is disclosed in U.S. Pat. No. 3,309,330. The latex coating particle has an inner terpolymer core layer having a relatively high vinylidene chloride concentration, i.e. 88-96% by weight with a relatively low alkyl acrylate and acrylic acid concentration, and an outer terpolymer coating portion having a relatively low vinylidene chloride concentration, i.e., from 60-88% by weight with a high concentration of acrylonitrile or alkyl acrylate or alkyl methyl acrylate, and acrylic or methacrylic acid. These latex particles provide a coating for thermoplastic films with good gas barrier properties as well as low surface friction and low blocking characteristics. Thermoplastic films coated with this type of latex coating possess good surface qualities and also have a relatively low minimum heat sealing temperature of approximately 103° C. (or about 217° F.). However, as shown in the table in column 5 of the specification of U.S. Pat. No. 3,304,330, the coated film has a relatively low heat-seal strength, at about 140° C. (or 284° F.) of only 350 grams/inch. Although this heat-seal strength provides a vast improvement over a physical mixture of the components, such a low heat seal strength is not satisfactory for most packaging applications.

Accordingly, none of the related art provides a latex coating which imparts to a thermoplastic film improved oxygen and vapor barrier properties without sacrificing one or many of the desirable surface properties, such as heat seal strength, low minimum seal temperature, and/or machinability, e.g., low coefficient of friction and blocking characteristics.

It is therefore an object of this invention to provide a multi-layered copolymer particle latex coating which imparts to thermoplastic films coated therewith high barrier qualities in addition to providing superior surface qualities including blocking and friction characteristics without sacrificing desirable minimum sealing temperatures and high heat seal strength.

SUMMARY OF THE INVENTION

These and other objects are achieved by the present invention which provides a semi-continuous, multi-stage polymerization process for synthesizing a heat-sealable multi-layered composite particle latex. The multi-layered composite latex particles of this invention provide excellent oxygen and vapor barrier properties without hindering the desired surface properties, including high heat-sealing strength, low minimal seal temperature, excellent machinability, i.e. low blocking and low coefficient of friction. The latex particles of the present invention are formed as three-layered composite particles having an acrylic ester seed layer composed of a copolymer of methyl methacrylate and methyl acrylate. The latex particles have an intermediate core layer composed of a terpolymer having a high vinylidene chloride concentration, the other comonomers of the core layer include methyl acrylate and methacrylic acid The latex particles also include an outer skin layer composed of a terpolymer having a low vinylidene chloride concentration, the other comonomers of the outer skin layer also include methyl acrylate and methacrylic acid. An aqueous latex of these particles is coated when wet onto substrates, such as thermoplastic films, i.e. oriented polypropylene or polyethylene films. After drying, the coated film exhibits superior oxygen and vapor barrier properties, excellent surface properties including good machinability and sealability. The coated film also exhibits excellent heat-seal strength and low minimum sealing temperature.

For a better understanding of the present invention, reference is made to the following description and examples taken in conjunction with the accompanying tables and figure, the scope of which is pointed out in the appended claims.

DETAILED DESCRIPTION OF THE INVENTION

Figure 1:
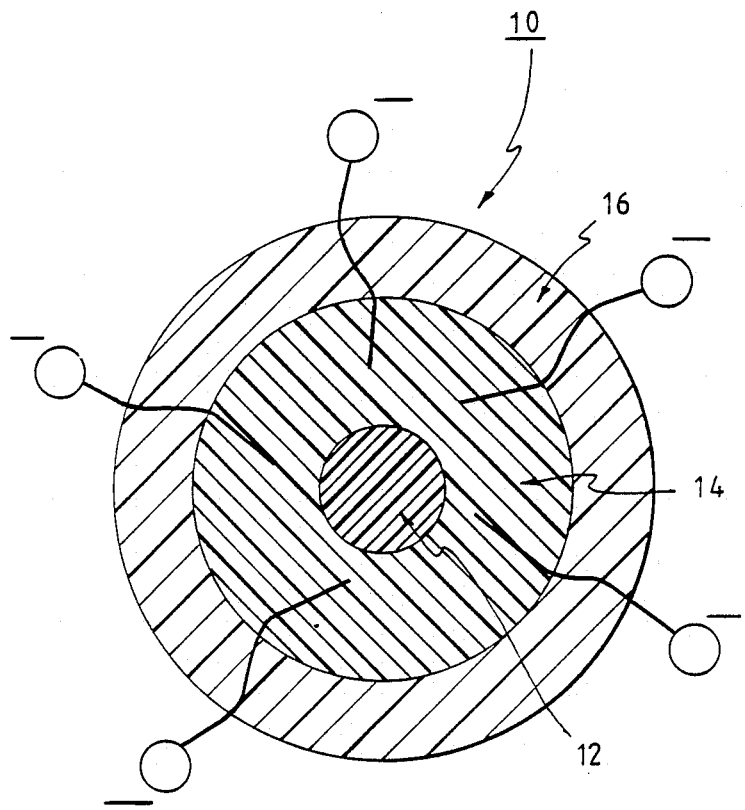
FIG. 1 illustrates the preferred three layered composite latex particle of the present invention.

The preferred three-layered composite latex particle of the present invention is illustrated in FIG. 1. The latex particle 10 contains an acrylic ester seed layer 12. Acrylic esters have the general formula $C_nH_{2n-2}O_2$ and the generalized structure shown below:

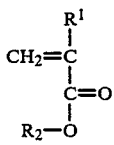

(1. Acrylic Esters)

in which $R_1 = H$ and $R_2 = C_1-C_8$.

The seed layer 12 imparts to films coated with the latex particle 10 the properties of high heat-seal strength (crimp strength) and low minimal seal temperature (MST). The seed layer 12 is formed by the emulsion polymerization of two monomers, the first monomer is a methacrylate, such as: methyl methacrylate, ethyl methacrylate, n-propyl methacrylate, isopropyl methacrylate, isobutyl methacrylate, vinyl acetate and styrene, preferably methyl methacrylate (MMA), which has the same structure of an acrylic ester except that both $R_1$ and $R_2$ are $CH_3$. The second monomer is an acrylic ester, such as methyl acrylate, ethyl acrylate, n-propyl acrylate, isopropyl acrylate, n-butyl acrylate, isobutyl acrylate and hexyl acrylate, preferably methyl acrylate (MA), an acrylic ester in which $R_1 = H$ and $R_2 = CH_3$. The ratio of MMA:MA can be from about 25.4 to about 65.4 parts by weight MMA, and from about 34.6 to about 74.6 parts by weight MA; preferably from about 35.4 to about 55.4 parts by weight MMA, and from about 44.6 to about 64.6 parts by weight MA, most preferably from about 45.4 points by weight MMA and about 54.6 parts by weight MA, respectively. The seed layer 12 is preferably less than 20 nm in diameter.

In addition to providing for low MST and high heat seal strength, the acrylic seed layer 12 provides a high glass transition temperature (Tg), and allows for improved control over the size of the latex particles 10. The acrylic seed layer 12 is preferably about 2.5% by weight of the three layer latex particle 10.

Surrounding the acrylic seed layer 12 is an intermediate core layer 14 which is composed of a terpolymer having a high concentration of vinylidene chloride (VDC). The VDC concentration in the intermediate core layer 14 can range from about 78.2% by weight to about 98.2% by weight, preferably from about 83% by weight to about 95% by weight, and most preferably about 88% by weight. VDC has the following structural formula:

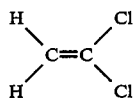

(2. Vinylidene Chloride)

In these concentrations VDC provides the coated film with good oxygen and moisture barrier properties, i.e. low transmissibility of oxygen (TO$_2$).

The terpolymer making up the intermediate core layer 14 also includes an acrylic ester comonomer, such as methyl methacrylate, n-propyl methacrylate, isopropyl methacrylate, vinyl acetate and styrene, preferably methyl acrylate. The concentration of the acrylic ester comonomer, i.e. MA, in the intermediate core layer 14 can range from about 5.7% by weight to about 15.7% by weight, preferably from about 7.7% by weight to about 13.7% by weight, and most preferably about 10.7% by weight. MA provides the coated film with good surface properties for machinability and heat-sealability. The remaining comonomer of the intermediate core layer 14 is an acrylic acid, such as methacrylic acid, acrylic acid, itaconic acid and maleic acid, preferably methacrylic acid (MAA). The concentration of the acrylic acid, i.e. MAA in the intermediate core layer 14 can range from about 0.5% by weight to about 1.5% by weight, preferably from about 0.8% by weight to about 1.2% by weight, and most preferably about 1.0% by weight. MAA increases the heat seal strength and the adhesion of the latex to the film. MAA has a structural formula which is similar to acrylic esters, except that in MAA $R_1 = CH_3$ and $R_2 = H$. The intermediate core layer 14 is preferably about 54% by weight of the three layered latex particle 10.

Surrounding the intermediate core layer 14 is an outer skin layer 16 composed of a terpolymer having a low concentration of VDC. The VDC concentration in the outer skin layer 16 can range from about 68% by weight to about 78% by weight, preferably from about 70% by weight to about 76% by weight, most preferably about 73% by weight. The terpolymer making up the outer skin layer 16 includes an acrylic ester comonomer, such as methyl acrylate, ethyl acrylate, n-propyl acrylate, isopropyl acrylate, n-butyl acrylate, isobutyl acrylate and hexyl acrylate, preferably MA. The concentration of acrylic ester, such as MA, in the outer skin layer 16, can range from about 16% by weight to about 26% by weight, preferably from about 19% by weight to about 23% by weight, and most preferably about 21% by weight. The third comonomer of the outer skin layer 16 is an acrylic acid, such as methacrylic acid, acrylic acid, itaconic acid and maleic acid, preferably MAA which can be present in a concentration of from about 0.5% to about 1.5% by weight, preferably from about 0.8% to about 1.3% by weight, most preferably in a concentration of about 1% by weight. The outer skin layer 16 can make up from about 58% to about 78% of the combined weight of the inner seed layer 12 and the intermediate core layer 14, preferably from about 63% to about 73% of the combined weight of the inner seed layer 12 and the intermediate core layer 14, and most preferably about 68% of the combined weight of the inner seed layer 12 and the intermediate core layer 14 of the composite latex particles 10.

The latex particles have a diameter of about 50 nm to about 100 nm, preferably from about 70 nm to about 80 nm. The latex particles are prepared in a multi-stage, semi-continuous emulsion polymerization process described in detail in the examples which follow. The latex containing the particles is a milky colloidal suspension with a pH ranging from about 1.5 to about 3, preferably about 2. The latex particles have a glass transition temperature, (Tg) ranging from about 15° C. to about 35° C., preferably from about 25° C. to about 30°C. The aqueous latex suspension is coated, preferably at room temperature, onto the surface of a thermoplastic film, such as cast polypropylene, oriented polypropylene, coextruded film, nylon, white opaque film, cellophane, polyesters, high density polyethylene and linear low density polyethylene, preferably oriented polypropylene (OPP). Prior to and after coating, standard additives may be introduced into the aqueous latex suspension, such as talc, silica, and wax. For example, a preferred aqueous latex coating solution containing approximately 33% by wt. solids, would include about 100 parts by wt. of the aqueous latex particles; from about 0.4 to about 0.6 parts by wt. talc, preferably 0.5 parts by wt. talc; from about 3 to about 7 parts by wt.

wax; and, the remainder comprises water. The aqueous latex is preferably coated onto an OPP film by rolling at a coating weight of from about 0.5 to about 4.5 grams/1000 in² OPP, preferably about 1.5 grams/1000 in² of film, and dried.

The aqueous latex coating composition of the present invention, containing the novel three-layered composite particles 10, is formed by a semi-continuous three-stage aqueous phase emulsion polymerization process described in the following examples

EXAMPLE 1

First State Polymerization

In the first stage polymerization, the seed layer 12 made of acrylic ester latex was formed.

The acrylic seed latex was formed by combining in a five (5) liter flask 700 parts by weight water, at 80° C. and stirring in 45.4 parts by weight MMA and 54.6 parts by wt. MA to achieve a total solids content of about 11%.

To this mixture a 10% sipex SB-sodium lauryl sulfate ("SIPEX") solution was added in a concentration of 172.27 parts by weight, and 18.2 parts by weight of a 5% ammonium persulfate ("APS") catalyst $(NH_4)_2S_2O_8$ was then added. The solution was incubated under stirring conditions for approximately ninety (90) minutes and then cooled to room temperature. The seed latex was harvested by filtration through a cheese cloth to recover a milky colloidal filtrate having a diameter of less than 20 nanometers (nm) and having a blue/green color.

EXAMPLE 2

Second Stage Polymerization

In the second stage polymerization step, the intermediate VDC terpolymer core layer 14 was formed about the acrylic seed latex prepared in Example 1.

The intermediate VDC terpolymer core layer 14 was prepared by combining in a five (5) liter flask, approximately 148 parts by wt. water with two (2) parts by wt. SIPEX, 10 parts by wt. APS catalyst, and 10 parts by wt. sodium bi-sulfate ("SBS"). The first stage acrylic seed latex prepared in Example 1, approximately 36 parts by wt., was added to this mixture and heated under stirring conditions to 45° C.

The heated emulsion was then combined with 88.2 parts by wt. VDC, 10.7 parts by wt. MA, and 1 part by wt. MAA (for a total of 100 parts of the monomer mixture) which was fed into the heated emulsion over a three (3) hour period. The mixture was then stirred for approximately 3-5 hours to polymerize the intermediate core layer 14 about the seed layer 12.

EXAMPLE 3

Third Stage Polymerization

In the third stage polymerization, the outer skin layer 16 was formed about the intermediate core layer 14 of the second stage polymerization product prepared in Example 2.

The outer skin layer 16 was formed about the intermediate core layer 14 by adding to the second stage emulsion product for 2½ hours at 45° C., a monomer mixture which included, 78 parts by wt. VDC; 21 parts by wt. MA; and one (1) part by wt. MAA over a 2½ hr. period. The reaction mixture was then stirred for an additional 30 minutes to form the outer skin layer 16. The mixture was then cooled to room temperature and filtered through a cheese cloth. A milky colloidal suspension was obtained in the filtrate having a particle size of approximately 70-80 (±20) nm. The filtrate had a pH of approximately 2.

EXAMPLE 4

A commercially available aqueous PVDC latex emulsion was supplied by W. R. Grace and coated onto an oriented polypropylene film, at a coating weight of approximately 0.5 g/1000 in² and dried for 24 hours. The particles of the no VDC, and a shell layer containing approximately 78% VDC. The coated film was tested for oxygen transmissibility (TO₂) measured in cc/100 in² over a period of 24 hours; minimum sealing temperature (MST) measured in °F; blocking measured in g/in; and, coefficient of friction (COF); as well as, crimp strength after heat sealing at 240° F. The results are tabulated on Table 1, at Column I for the low VDC coated film.

EXAMPLE 5

A two-layer particle latex emulsion was synthesized in accordance with the first and second stage polymerizations described in Examples 1 and 2. The composition of the outer layer was adjusted to 82 parts by wt. VDC (the third stage polymerization was omitted). The colloidal suspension of latex particles was filtered through a cheese cloth and cooled to room temperature. The aqueous latex emulsion was coated onto an OPP film at a coating weight of 2.5 g/1000 in², and dried. The results are tabulated on Table 2, at Column II for the high VDC coated film.

EXAMPLE 6

The three layer particle latex coating of the present invention was prepared in Examples 1-3. The seed layer contained 0 parts by wt. VDC, the intermediate core layer contained 88 parts by wt. VDC, and the outer skin layer contained 78 parts by weight VDC. The latex emulsion was cooled to room temperature and coated onto an oriented polypropylene film at a coating weight of 2.5 grams/1000 in², dried as described in Example 5, and tested for TO₂, MST, blocking, COF, and crimp strength. The results of these tests are tabulated in Table 1, Column III, labeled the three layer coating.

TABLE 1

| OPP Film Coated with the Multi-layered Latex | PVDC Multi-Layered Latex Coating Composition | | |
|---|---|---|---|
| | I. Control Low VDC Coated [tradename film] 1st/2nd | II. Two layer high high VDC coated film 1st/2nd | III. Three layer Coating 1st/2nd/3rd |
| VDC (parts by weight) | 0/78 | 0/82 | 0/88/78 |
| Total VDC (parts by weight) | 78 | 82 | 82 |
| Coating weight (g/1000 in²) | 1.5 | 1.5 | 1.5 |
| TO₂ (cc/100 in²) | 3.8 | 2.5 | 2.6 |
| MST (°F.) | 205 | 215 | 213 |

TABLE 1-continued

|  | PVDC Multi-Layered Latex Coating Composition | | |
|---|---|---|---|
| OPP Film Coated with the Multi-layered Latex | I. Control Low VDC Coated [tradename film] 1st/2nd | II. Two layer high high VDC coated film 1st/2nd | III. Three layer Coating 1st/2nd/3rd |
| Blocking (g/in) | 7.4 | 17 | 6.7 |
| COF | 0.29 | 0.35 | 0.26 |
| Crimp Strength (g/in) heat seal @ 240° F. | 1019 | 800 | 1065 |

As shown in Table 1, the multi-layered particle of the present invention results in a latex coated thermoplastic film, e.g. OPP film, having extremely low oxygen transmissibility, as compared to the OPP film coated with the prior art control two layer particle having a low VDC content. The film coated with the latex of the present invention has an oxygen transmissibility which is as low as the film coated with the high VDC two layer particle latex. The coating of the present invention results in a MST of 213° F., as compared with 205° F. for the low VDC control, and 215° F. for the high VDC two layer particle latex coated films, respectively. The coated film of the present invention also shows its superiority in its extremely low blocking of 6.7 g/in as compared to 17 g/in, and in its low COF of 0.26 g/in as compared to 0.35 g/in, respectively, for the high VDC two layer latex coated film. Lastly, the heat seal strength (crimp strength) of the film coated with the three layer particle latex of the present invention was superior to either the films coated with the low VDC control, or the high VDC two layer particle latex, exhibiting a crimp strength at 240° F. of 1065 g/in., as compared to lower crimp strengths of 1019 g/in. and 800 g/in., respectively, of the two layer particle latex coated films. By contrast, as discussed in the "Background of the Related Art" section, supra, the two layer VDC particle latex coated film of U.S. Pat. No. 3,309,330, exhibits a MST of about 217° F., and an extremely low crimp strength of only 350 g/in when heat sealed at 280° F.

In summary, thermoplastic films, e.g. OPP films, coated with the multi-layered particle latex of the present invention obtain high oxygen and vapor barrier properties while maintaining low minimal seal temperature, superior blocking and friction characteristics for good machinability and processability, while improving their heat seal (crimp) strength, in comparison to the two layer particle latex coated films of the prior art.

Thus, while there have been described what are the presently contemplated preferred embodiments of the present invention, further changes and modifications could be made by those skilled in the art without departing from the scope of the invention, and it is contemplated to claim all such changes and modifications.

I claim:

1. A multi-stage semi-continuous emulsion polymerization process for preparing a multi-layered composite particle acrylic latex coating, comprising:
   (a) polymerizing an acrylic seed latex by combining from about 25.4 to about 65.4 parts by weight methyl methacrylate and from about 34.6 to about 74.6 parts by weight methyl methacrylate in an aqueous catalytic solution and incubating the suspension under suitable polymerization conditions until polymerized;
   (b) separating the polymerized seed latex from said monomeric components;
   (c) forming an intermediate terpolymer core layer over said acrylic seed latex particles by combining said seed latex in an aqueous polymerization catalytic solution with from about 78.2 to about 98.2 parts by weight vinylidene chloride, from about 5.7 to about 15.7 parts by weight methyl acrylate, and from about 0.5 to about 1.5 parts by weight methacrylic acid under suitable polymerization conditions until said intermediate core layer is formed over said acrylic seed latex particles in an aqueous suspension;
   (d) forming an outer skin layer over said intermediate core layer by adding to said aqueous suspension from about 68 to about 78 parts by weight VDC, from about 16 to about 26 parts by weight methacrylate, and from about 0.5 to about 1.5 parts by weight methacrylic acid under suitable polymerization conditions until the outer skin layer is formed about said intermediate core layer in said aqueous emulsion; and,
   (e) separating multi-layered latex particles from said monomeric components in an aqueous latex suspension.

2. The process of claim 1, further comprising:
coating said multi-layered particle aqueous latex suspension onto the surface of a thermoplastic film; and,
drying said coated film.

3. The process of claim 2, further comprising adding silica, wax and talc to said aqueous latex suspension coated on said thermoplastic film.

4. The process recited in claim 3, wherein:
said film is selected from the group consisting of cast polypropylene, oriented polypropylene, coextruded film, nylon, white opaque film, cellophane, polyesters, high density polyethylene and linear low density polyethylene.

* * * * *